(12) United States Patent
Petrosky

(10) Patent No.: US 10,311,982 B2
(45) Date of Patent: Jun. 4, 2019

(54) HOLDING FIXTURE TO ASSIST IN ASSEMBLY OF SUPPORT GRID FOR NUCLEAR FUEL RODS AND METHOD FOR ASSEMBLING SUPPORT GRID FOR NUCLEAR FUEL RODS

(71) Applicant: WESTINGHOUSE ELECTRIC COMPANY LLC, Cranberry Township, PA (US)

(72) Inventor: Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 408 days.

(21) Appl. No.: 15/045,892

(22) Filed: Feb. 17, 2016

(65) Prior Publication Data

US 2017/0236603 A1    Aug. 17, 2017

(51) Int. Cl.
| G21C 3/332 | (2006.01) |
| G21C 3/33 | (2006.01) |
| G21C 3/352 | (2006.01) |
| B23Q 3/00 | (2006.01) |
| G21C 3/356 | (2006.01) |

(52) U.S. Cl.
CPC .............. *G21C 3/332* (2013.01); *G21C 3/331* (2013.01); *B23Q 3/00* (2013.01); *G21C 3/352* (2013.01); *G21C 3/356* (2013.01); *Y02E 30/40* (2013.01)

(58) Field of Classification Search
CPC ........ G21C 3/34; G21C 3/3424; G21C 3/331; G21C 3/352; G21C 3/356; B23Q 3/00
See application file for complete search history.

(56) References Cited

U.S. PATENT DOCUMENTS

| 3,377,254 A | * | 4/1968 | Frisch | ............... G21C 3/32 |
| | | | | 376/442 |
| 4,539,738 A | * | 9/1985 | Antol | ............... G21C 3/3424 |
| | | | | 228/49.1 |
| 9,020,091 B2 | | 4/2015 | Lu et al. | |
| 9,053,827 B2 | | 6/2015 | Lewis et al. | |
| 2010/0166135 A1 | | 7/2010 | Park et al. | |

FOREIGN PATENT DOCUMENTS

| JP | 2004-117187 A | 4/2004 |
| JP | 2005-003453 A | 1/2005 |
| KR | 10-2009-0132559 A | 12/2009 |
| KR | 10-1474548 B1 | 12/2014 |

OTHER PUBLICATIONS

Korean Intellectual Property Office, "International Search Report and Written Opinion from corresponding PCT application No. PCT/US2017/014809", dated Apr. 20, 2017, 11 pp.

* cited by examiner

*Primary Examiner* — Lily C Garner
(74) *Attorney, Agent, or Firm* — Joseph C. Spadacene; Westinghouse Electric Company LLC

(57) ABSTRACT

A holding fixture for assisting in assembly of a support grid for nuclear fuel rods and including a plurality of straps each having a plurality of slots extending approximately half a height of the straps and tabs formed beside or between the slots. The holding fixture includes an actuation plate, a support plate having a plurality of receiving members structured to receive therein straps of the support grid and having a plurality of cells, and a plurality of cam assemblies structured to move to deflect every other tab of the straps received in the plurality of receiving members. The cam assemblies are disposed in every other cell of the support plate.

19 Claims, 9 Drawing Sheets

HOLDING FIXTURE TO ASSIST IN ASSEMBLY OF SUPPORT GRID FOR NUCLEAR FUEL RODS AND METHOD FOR ASSEMBLING SUPPORT GRID FOR NUCLEAR FUEL RODS

BACKGROUND

1. Field

This invention pertains generally to support grids for nuclear fuel rods and more particularly to a holding fixture to assist in assembly of support grids for nuclear fuel rods.

2. Related Art

In most water cooled nuclear reactors, the reactor core is comprised of a large number of elongated fuel assemblies. In pressurized water nuclear reactors (PWR), these fuel assemblies typically include a plurality of fuel rods held in an organized array by a plurality of grids spaced axially along the fuel assembly length and attached to a plurality of elongated thimble tubes of the fuel assembly. The thimble tubes typically receive control rods or instrumentation therein. Top and bottom nozzles are on opposite ends of the fuel assembly and are secure to the ends of the thimble tubes that extend above and below the ends of the fuel rods.

The grids, as is known in the relevant art, are used to precisely maintain the spacing and support between the fuel rods in the reactor core, provide lateral support for the fuel rods and induce mixing of the coolant. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in the cells that are sized the same as those that receive fuel rods therein, or in relatively larger thimble cells defined in the interleaved straps. The interleaved straps provide attachment points to the thimble tubes, thus enabling their positioning at spaced locations along the length of the fuel assembly.

Referring to FIG. 1, a portion of an upper strap 2 and a lower strap 4 from a conventional grid design are shown. The straps 2,4 each include a plurality of slots 6. The slots 6 extend approximately half the height of the straps 2,4 and form tabs 7 beside each of the slots 6. The straps 2,4 are assembled by arranging the upper strap 2 perpendicular with respect to the lower strap 4 and sliding a slot 6 of the upper strap 2 into a corresponding slot 6 of the lower strap 4. While a portion of one upper strap 2 and one lower strap 4 are shown in FIG. 1, a conventional grid design typically includes twelve to sixteen sets of upper and lower straps 2,4. The upper and lower straps 2,4 may also include flow vanes 9 extending at an angle from the top portions of the upper and lower straps 2,4.

An example of a portion of an assembled conventional grid 10 is shown in FIG. 2 and an elevational view of a fuel assembly 40 employing the grid 10 is shown in FIG. 3. The flow vanes 9 are not shown in FIGS. 2 and 3. The fuel assembly 40 is of the type used in a pressurized water reactor and basically includes a lower end structure or bottom nozzle 42 for supporting the fuel assembly on a lower core plate (not shown) in the reactor core region and a number of longitudinally extending guide thimbles or tubes 44 which project upwardly from the bottom nozzle 42. The assembly 40 further includes a plurality of grids 10. The grids 10 are axially spaced along and supported by the guide thimbles 44. Assembly 40 also includes a plurality of elongated fuel rods 36 transversely spaced and supported in an organized array by the grids 10. Also, the assembly 40 has an instrumentation tube 46 located in the center thereof and an upper end structure or nozzle 48 attached to the upper ends of the guide thimbles 44. With such an arrangement of parts, the fuel assembly 40 forms an integral unit capable of being conveniently handled without damaging the assembly of parts.

As mentioned above, the fuel rods 36 and the array thereof in the assembly 40 are held in spaced relationship with one another by the grids 10 spaced along the fuel assembly length. Each fuel rod 36 includes nuclear fuel pellets 50 and the opposite ends of the rods 36 are enclosed by upper and lower end plugs 52 and 54, to hermetically seal the rod. Commonly, a plenum spring 56 is disposed between the upper end plug 52 and the pellets 50 to maintain the pellets in a tight, stacked relationship within the rod 36. The fuel pellets 50 composed of fissile material are responsible for creating the reactive power of the PWR. A liquid moderator/coolant, such as water or water-containing boron, is pumped upwardly through the fuel assemblies of the core in order to extract heat generated therein for the production of useful work.

To control the fission process, a number of control rods 58 are reciprocally movable in the guide thimbles 44 located at predetermined positions in some of the fuel assemblies 40. Specifically, the top nozzle 48 has associated therewith a rod cluster control mechanism 60, having an internally threaded cylindrical member 62 with a plurality of radially extending flukes or arms 64 such that the control mechanism 60 is operable to move the control rods 58 vertically in the guide thimbles 44 to thereby control the fission process in the fuel assembly 40, all in a well-known manner.

Assembling the grid 10 involves mating numerous upper and lower straps 2,4 together. However, the tight tolerances of the corresponding slots 6 in the upper and lower straps 2,4 make it difficult to properly align and mate the straps 2,4. In particular, it is difficult to automate the mating of the straps 2,4 and to mate multiple sets of straps 2,4 to each other simultaneously. As such, the assembly of the grid 10 is labor intensive, error prone and costly. It is thus desired to more efficiently assemble grids such as the conventional grid 10.

SUMMARY

In accordance with an embodiment of this concept these and other objects are satisfied by a holding fixture for assisting in assembly of a support grid for nuclear fuel rods and including a plurality of straps each having a plurality of slots extending approximately half a height of the straps and tabs formed beside or between the slots. The holding fixture includes an actuation plate, a support plate having a plurality of receiving members structured to receive therein straps of the support grid and having a plurality of cells, and a plurality of cam assemblies structured to move to deflect every other tab of the straps received in the plurality of receiving members. The cam assemblies are disposed in every other cell of the support plate.

In accordance with another embodiment of this concept, these and other objects are satisfied by a holding fixture pair for assisting in assembly of a support grid for nuclear fuel rods and including a plurality of upper straps and a plurality of lower straps each having a plurality of slots extending approximately half a height of the straps and tabs formed beside or between the slots. The holding fixture pair includes an upper holding fixture and a lower holding fixture. The upper holding fixture includes an upper actuation plate, an upper support plate having a plurality of stand-offs structured to receive therein upper straps of the support grid and having a plurality of upper cells, and a plurality of upper cam assemblies structured to move to deflect every other tab of the upper straps received in the plurality of stand-offs. The upper cam assemblies are disposed in every other upper cell of the upper support plate. The lower holding fixture includes a lower actuation plate, a lower support plate having a plurality of notches structured to receive therein lower straps of the support grid and having a plurality of lower cells, and a plurality of lower cam assemblies structured to move to deflect every other tab of the lower straps received in the plurality of notches. The lower cam assemblies are disposed in every other lower cell of the lower support plate and the upper holding fixture flipped with respect to the lower holding fixture.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 3:
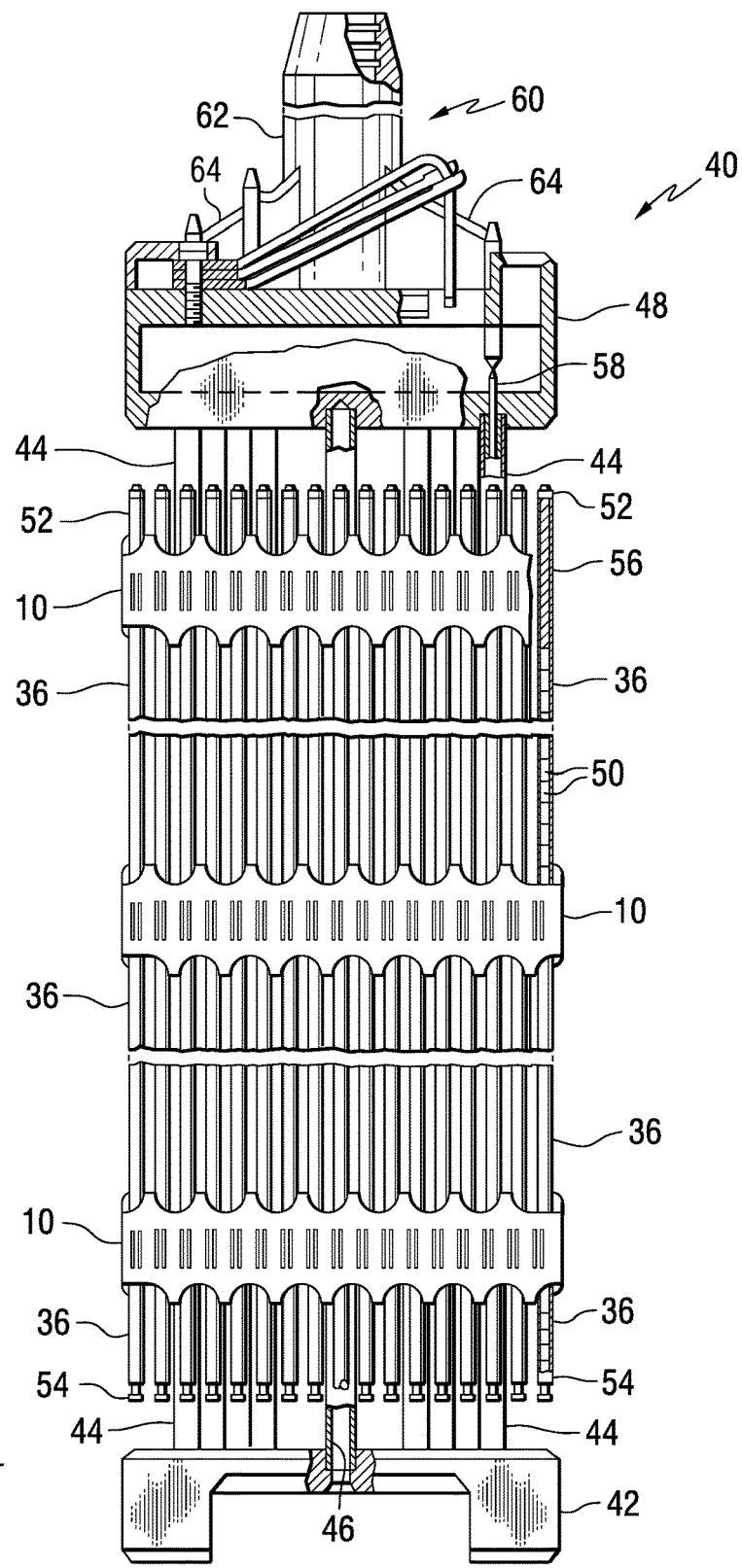
FIG. 3 is an elevational view, partially in section, of a fuel assembly which employs the grid of FIG. 2, the assembly being illustrated vertically foreshortened with parts broken away for clarity.
Figure 4A:
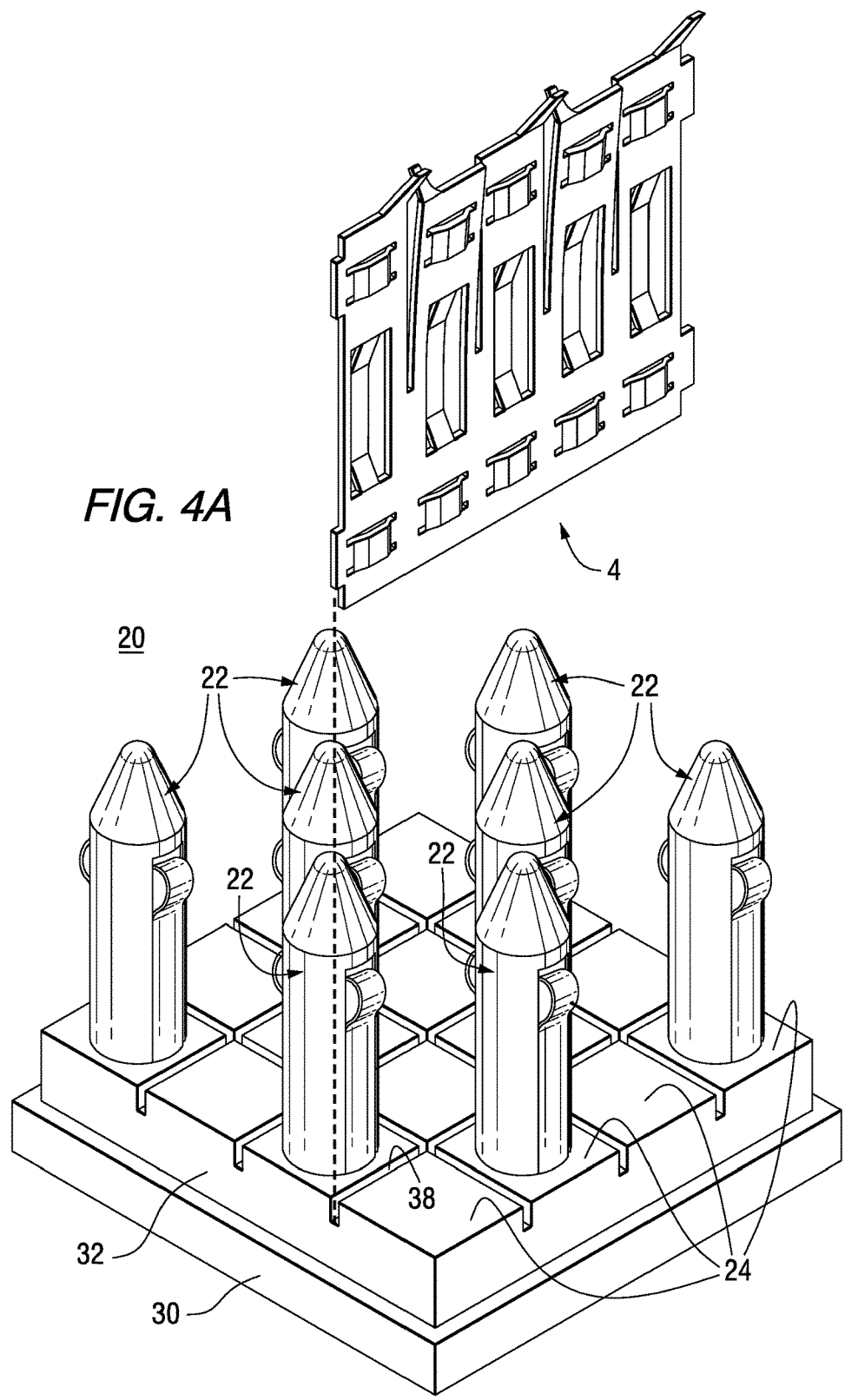
FIG. 4A is an isometric view of a portion of a lower holding fixture in accordance with an embodiment of the disclosed concept.

FIG. 4A is an isometric view of a portion of a lower holding fixture 20 in accordance with an example embodiment of the disclosed concept. The lower holding fixture 20 may be used in conjunction with a similar upper holding fixture 20' (see FIG. 4B) to assist with assembling a support grid for nuclear fuel rods, such as the grid 10 shown in FIGS. 2 and 3. Together, the lower holding fixture 20 and the upper holding fixture 20' are considered a holding fixture pair.

The lower holding fixture 20 is configured to hold the lower straps 4 of the grid 10 to receive the lower straps 4. The lower holding fixture 20 includes a plurality of cam assemblies 22 that are configured to interact with the lower straps 4 so as to deflect every other tab 7 of the lower straps 4. The lower holding fixture 20 includes a support plate 32 that includes a plurality of cells 24, and the cam assemblies 22 are disposed in every other cell 24. The support plate 32 includes receiving members, such as the notches 38 formed in the support plate 32, structured to receive therein the lower straps 4. The lower holding fixture 20 also includes an actuation plate 30. The actuation plate 30, support plate 32 and cam assemblies 22 will be described in more detail with respect to FIG. 7.

In order to more clearly illustrate the disclosed concept, only a limited size lower holding fixture 20 is shown in FIG. 4A. It will be appreciated by those skilled in the art that the lower holding fixture 20 may include any number of cells 24 and cam assemblies 22 without departing from the scope of the disclosed concept and, in particular, it will be appreciated by those having ordinary skill in the art that the lower holding fixture 20 may include many more cells 24 and cam assemblies 22 than the number shown in FIG. 4A.

Figure 4B:
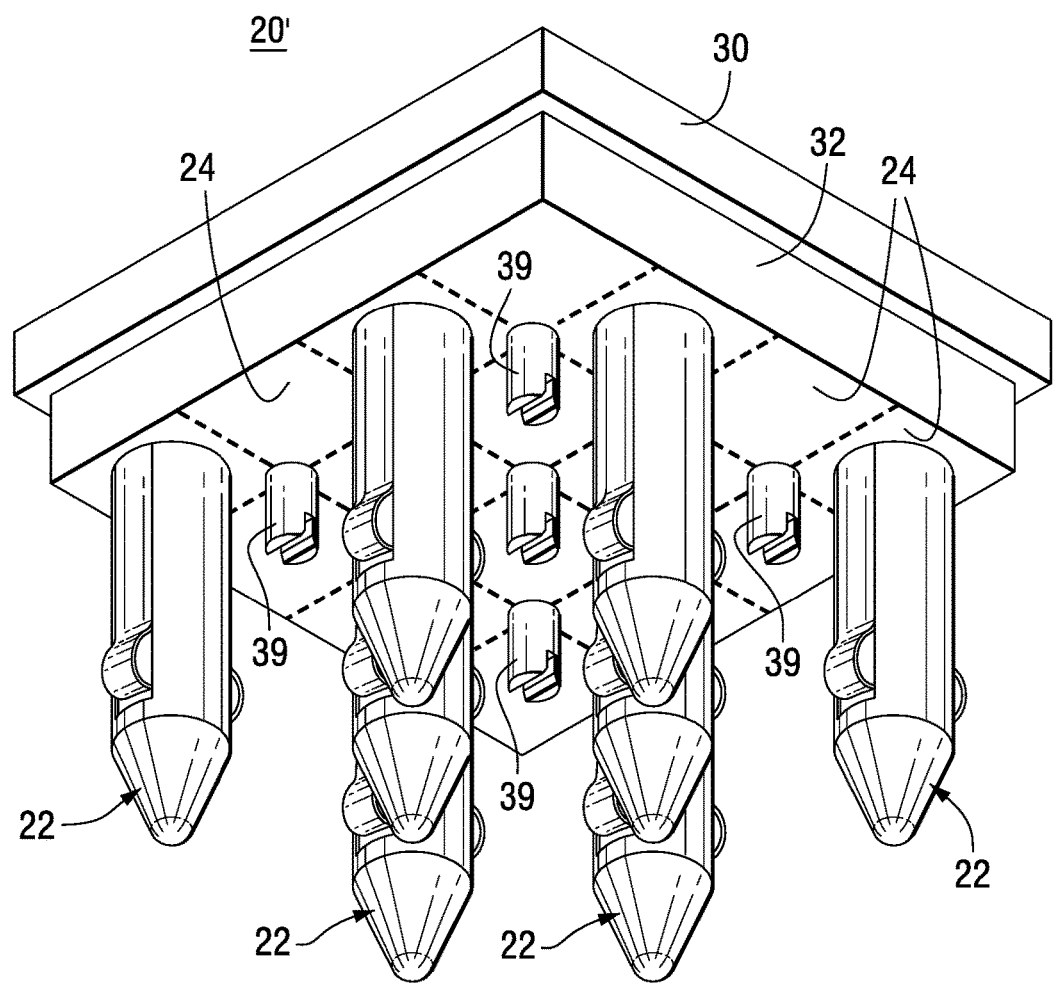
FIG. 4B is an isometric view of a portion of an upper holding fixture in accordance with an embodiment of the disclosed concept.

Referring to FIG. 4B, a portion of an upper holding fixture 20' in accordance with an example embodiment of the disclosed concept is shown. The upper holding fixture 20' is divided into cells 24 and includes cam assemblies 22 in every other cell 24, similar to the lower holding fixture 20. However, instead of the receiving members being notches 38 structured to receive the lower straps 4, the upper holding fixture 20' the support plate 32 of the upper holding fixture 20' includes receiving members that are stand-offs 39 disposed at the corners of the cells 24 and extending from a surface of the support plate 32. The top portions of the upper straps 2 are not able to be received in the notches 38 of the lower holding fixture 20 because of interference from the flow vanes 9. The stand-offs 39, on the other hand, extend away from a surface of the support plate 32 and are able to receive the upper straps 2 without the flow vanes 9 abutting against the surface of the support plate 32. As such, the stand-offs 39 allow the upper straps 2 to be received by the upper holding fixture 20'.

Figure 5A:
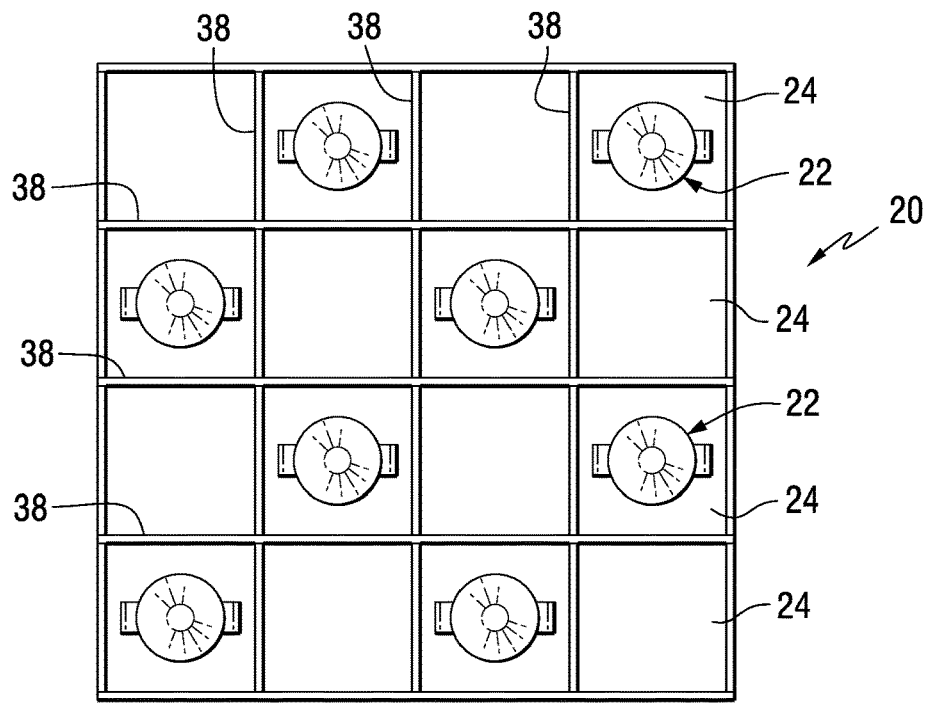
FIG. 5A is a top view of a lower holding fixture in accordance with an embodiment of the disclosed concept.
Figure 5B:
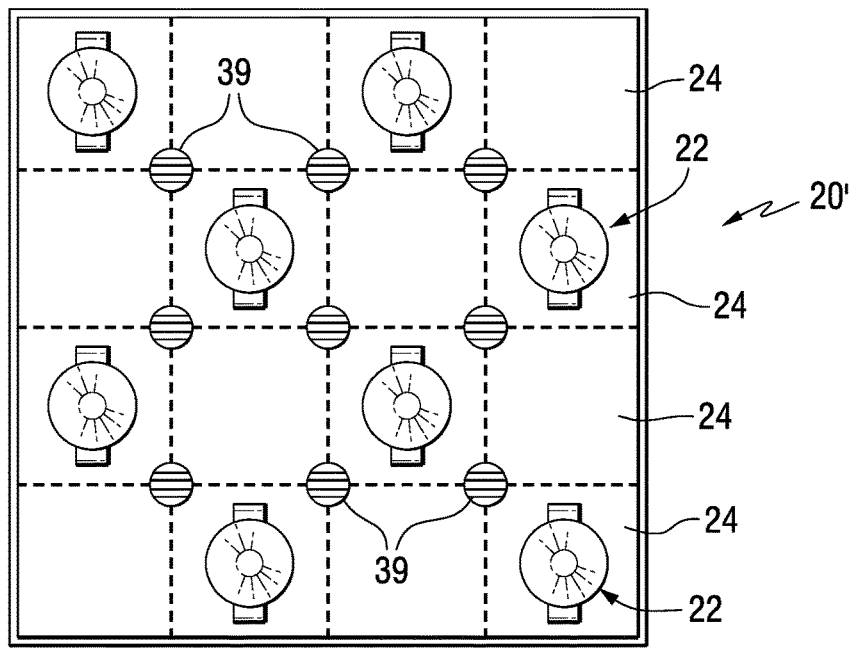
FIG. 5B is a bottom view of an upper holding fixture in accordance with an embodiment of the disclosed concept.

FIG. 5A is a top view of the lower holding fixture 20 and FIG. 5B is a bottom view of the upper holding fixture 20'. The lower and upper holding fixtures 20,20' are similar and similarly include cam assemblies 22 and cells 24. Moreover, similar to the lower holding fixture 20, the upper holding fixture 20' is configured to receive the upper straps 2 and to deflect every other tab 7 of the upper straps 2. However, as, shown in FIGS. 5A and 5B, the upper holding fixture 20' is flipped over with respect to the lower holding fixture 20. As such, the cam assemblies 22 of the lower and upper holding fixtures 20,20' face each other. Additionally, a cam assembly 22 of the upper holding fixture 20' will face an empty cell 24 of the lower holding fixture 20 and a cam assembly 22 of the lower holding fixture 20 with face an empty cell 24 of the upper holding fixture 20'. Additionally, the cam assemblies 22 of the lower holding fixture 20 will deflect tabs 7 of the lower straps 4 in different directions than the cam assemblies 22 of the upper holding fixture 20' deflect tabs 7 of the upper straps 2. For example, referring to the orientations of the lower and upper holding fixtures 20,20' shown in FIGS. 5A and 5B, the cam assemblies 22 of the lower holding fixture 20 will deflect tabs 7 of the lower straps 2 to the left or right, while the cam assemblies 22 of the upper holding fixture 20' will deflect tabs 7 of the upper straps 2 in upward or downward directions.

Figure 6:
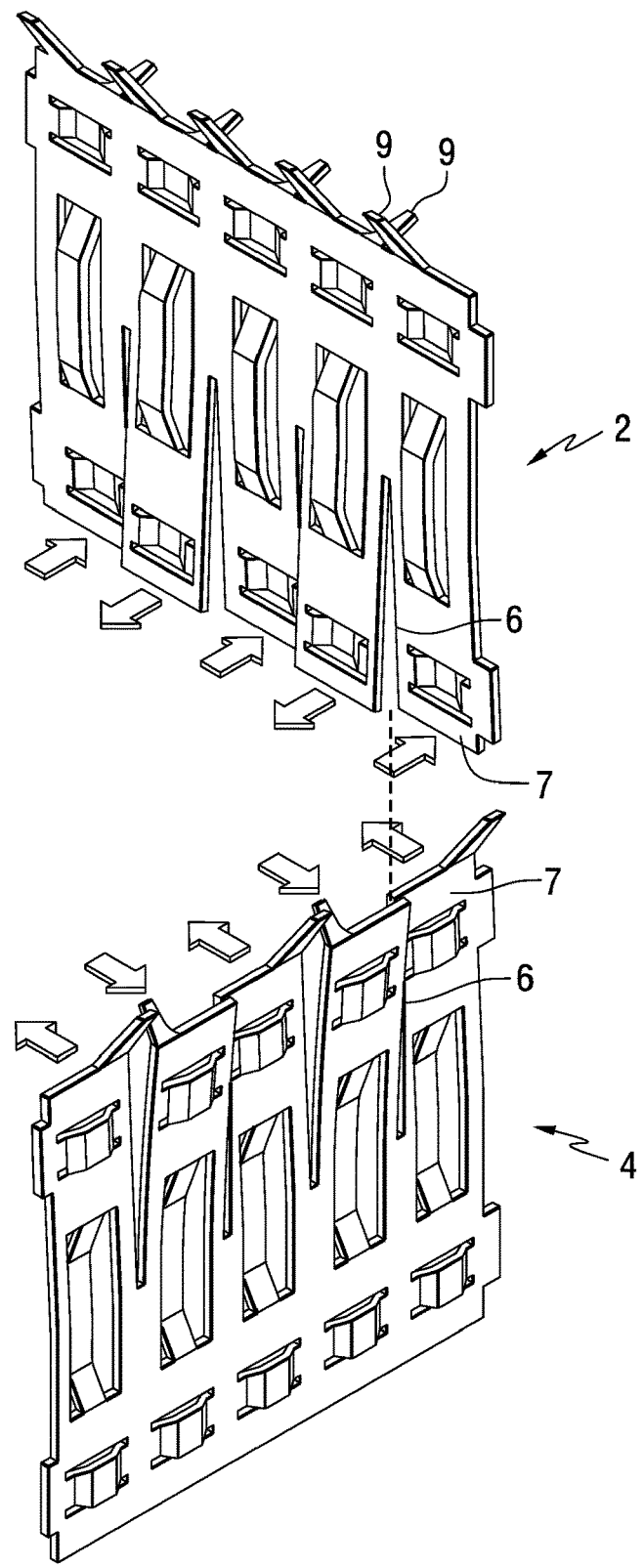
FIG. 6 is an isometric view illustrating deflections to upper straps by holding fixtures in accordance with embodiments of the disclosed concept.

FIG. 6 is an isometric view of a portion of an upper strap 2 and a lower strap 4 whose tabs 7 have been deflected by the cam assemblies 22 of the upper holding fixture 20' and the lower holding fixture 20, respectively. As shown in FIG. 6, adjacent tabs 7 of each of the straps 2,4 are deflected in opposite directions. The deflections by the cam assemblies 22 cause the slots 6 to form V-shapes. When tabs 7 of the upper and lower straps 2,4 are deflected so that the slots 6 form V-shapes, as is shown in FIG. 6, the upper and lower straps 2,4 can still be mated together even when there is some misalignment between the upper and lower straps 2,4. In contrast, when tabs 7 of the upper and lower straps 2,4 are not deflected, as is shown in FIG. 1, the upper and lower straps 2,4 will not be able to be mated together if they are misaligned.

Figure 1:
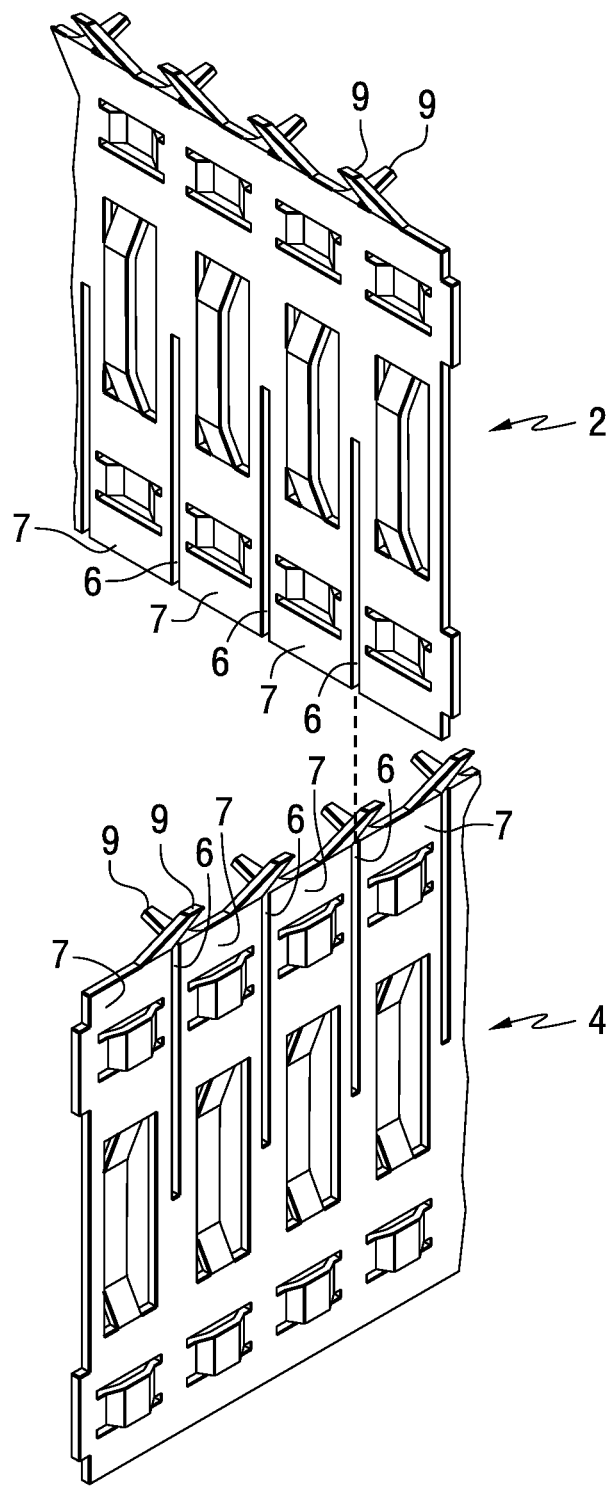
FIG. 1 is an isometric view of a portion of an upper strap and a lower strap.

The cam assemblies 22 of the lower and upper holding fixtures 20,20' are additionally adjustable so as to be able to deflect tabs 7 of the upper and lower straps 2,4 as well as to release the deflection and allow the tabs 7 of the upper and lower straps 2,4 to return to their original shape shown in FIG. 1. For example, the cam assemblies 22 can be used to deflect the tabs 7 of the upper and lower straps 2,4 until the upper and lower straps 2,4 are mated to each other. Then, the cam assemblies 22 can release the deflection and the lower and upper holding fixtures 20,20' can be removed the upper and lower straps 2,4. The result is the grid 10 shown in FIG. 2. However, by using the lower and upper holding fixtures 20,20' to assist with assembling the grid 10, multiple straps are able to be mated to each other simultaneously and there is a tolerance for some misalignment between the upper and lower straps 2,4.

Figure 7:
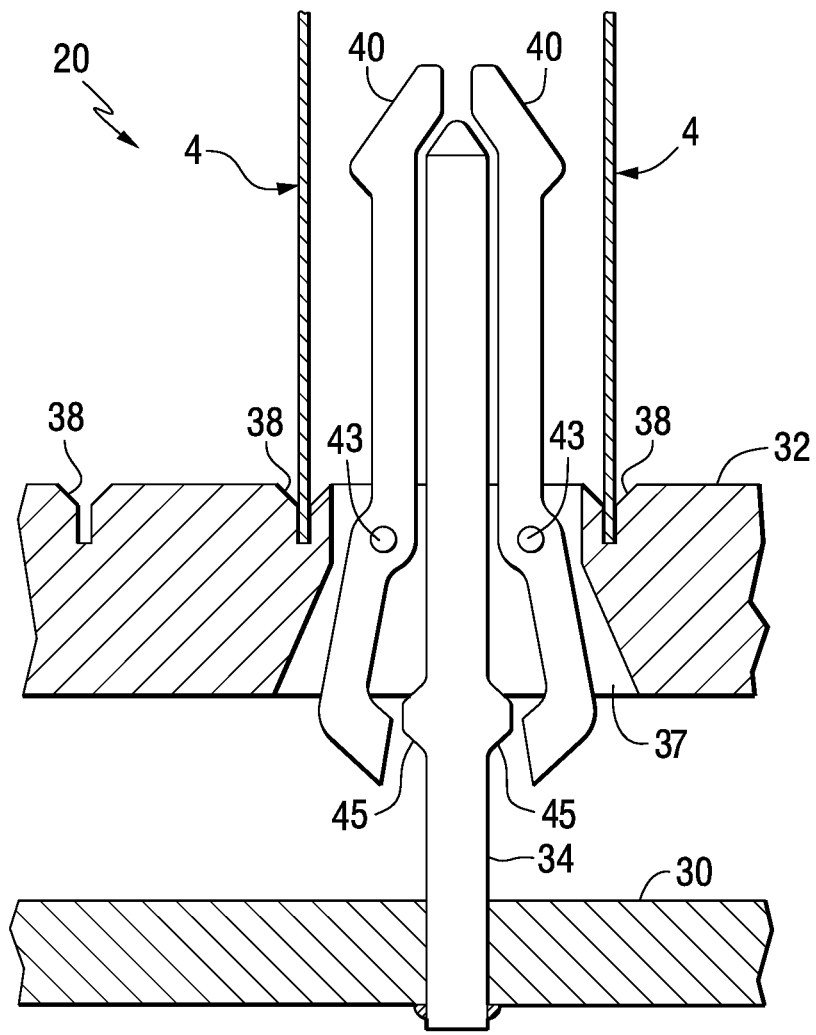
FIG. 7 is a cross-sectional view of a portion of a lower holding fixture in accordance with an embodiment of the disclosed concept.

Referring to FIG. 7, a cross-sectional view of a portion of the lower holding fixture 20 in accordance with an example embodiment of the disclosed concept is shown. The lower holding fixture 20 includes the actuation plate 30 and the support plate 32. A plurality of cam rods 34 are attached to the actuation plate 30 and extend in a direction substantially perpendicular away from the actuation plate 30. The support plate 32 includes a plurality of openings 37 that each allow a corresponding one of the cam rods 34 to pass therethrough.

A plurality of pairs of lever members 40 are hingedly attached to the support plate 32 via hinges 43. The hinges 43 are attached to the support plate 32 in the openings 37. The cam rods 34 each include a pair of protrusions 45 that interact with the lever members 40 to cause the lever members 40 to open outwardly and deflect tabs 7 of the lower straps 4 or to close inwardly and stop deflecting tabs 7 of the lower straps 4.

In more detail, the actuation plate 30 is able to move toward or away from the support plate 32. This actuation causes the cam rod 34, and the protrusions 45 on the cam rod 34 to move with respect to the lever members 40. In the position shown in FIG. 7, the protrusions 45 on the cam rod 34 are disposed so as to abut against a lower portion of the lever members 40, which causes the lever members 40 to close inwardly and not deflect tabs 7 of the lower straps 4. When the actuation plate 30 is actuated upward toward the support plate 32, the protrusions 45 of the cam rod 34 are moved upward and no longer abut against the lower portion of the lever members 40. The lower portions of the lever members 40 are thus able to move inward which causes the upper portions of the lever members 40 to move outward and deflect tabs 7 the lower straps 4. Thus, by movement of the actuation plate 30 with respect to the support plate 32, the lever members 40 can be controlled to deflect or stop deflecting tabs 7 of the lower straps 4. Together, one cam rod 34 and one pair of lever members 40 form one of the cam assemblies 22 shown in FIGS. 4A and 4B. The cam assemblies 22 may optionally also include a cover as shown in FIGS. 4A and 4B.

The lower holding fixture 20 further includes notches 38 formed therein. The notches 38 are structured to receive the lower straps 4. Thus, all the lower straps 4 to be included in the grid 10 can be placed in the notches 38 of the lower holding fixture 20. The upper holding fixture 20' includes similar notches 38 structured to receive the upper straps 2. All of the straps 2,4 of the grid 10 can thus be placed in the notches 38 of the lower and upper holding fixtures 20,20' and can be mated together simultaneously using the lower and upper holding fixtures 20,20'.

Although the lower holding fixture 20 has been described with respect to FIG. 7, the upper holding fixture 20' also includes similar components and operates in a similar manner as the lower holding fixture 20. The difference between the upper and lower holding fixtures 20,20' is that the upper holding fixture 20' includes stand-offs 39, rather than notches 38, to receive the upper straps 2, as has been previously described with respect to FIG. 4B. Therefore, for economy of disclosure, a separate description of the upper holding fixture 20' has been omitted and it will be appreciated by those having ordinary skill in the art that the cam rod 34 and pair of lever members 40 may be components of each of the cam assemblies 22 shown in the upper holding fixture 20' of FIG. 4B.

Figure 8:
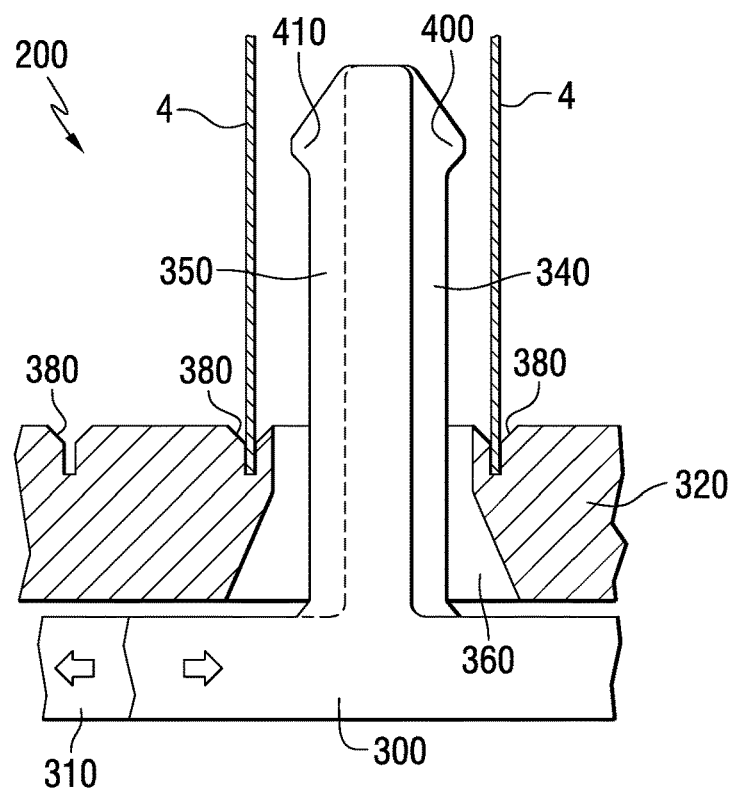
FIG. 8 is a cross-section view of a portion of a lower holding fixture in accordance with another embodiment of the disclosed concept.

Referring to FIG. 8, a cross-sectional view of a portion of a lower holding fixture 200 in accordance with another example embodiment of the disclosed concept is shown. Although only a cross-sectional view is shown in FIG. 8, the lower holding fixture 200 is arranged similar to the lower holding fixture shown in FIGS. 4 and 5A. That is, the lower holding fixture 200 includes a support plate 320 that includes a plurality of cells 24 and cam assemblies 22 that are disposed in every other cell 24. However, rather than the cam rods 34 and lever members 40 forming the cam assemblies 22, as in the lower holding fixture 20 of FIGS. 4 and 5A, the lower holding fixture 200 of FIG. 8 includes first and second cam rods 340,350 that form the cam assemblies 22.

The lower holding fixture 200 includes a first actuation plate 300, a second actuation plate 310 and a support plate 32. A plurality of first cam rods 340 are attached to the first actuation plate 300 and extend in a direction substantially perpendicular away from the first actuation plate 300. A plurality of second cam rods 350 are attached to the second actuation plate 310 and extend in a direction substantially perpendicular away from the second actuation plate 310. The support plate 320 includes a plurality of openings 360 that each allow a corresponding pair of the first and second cam rods 340,350 to pass therethrough.

Figure 9:
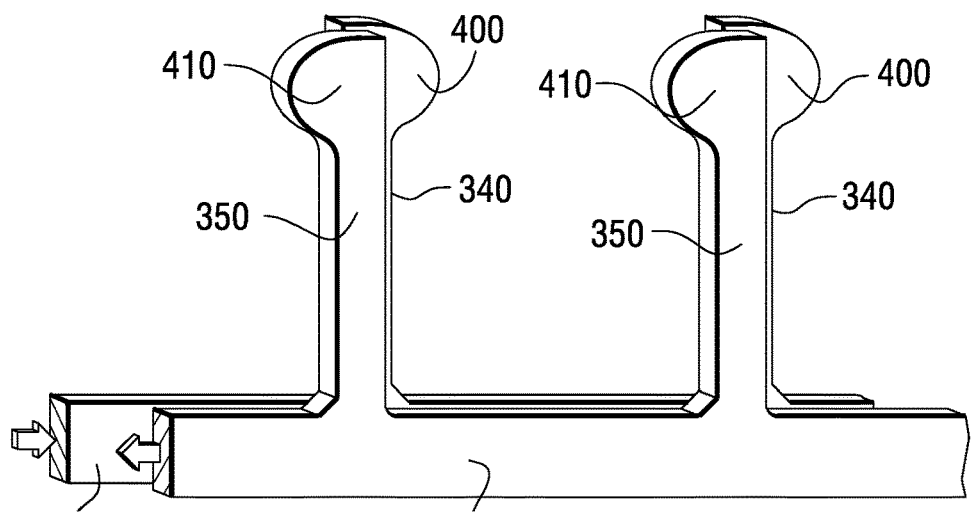
FIG. 9 is an isometric view of actuation plates of the lower holding fixture of FIG. 8.

The first and second actuation plates 300,310 are configured to move with respect to each other, as is shown in more detail in FIG. 9. The first and second cam rods 340,350 move in conjunction with the first and second actuation plates 300,310 so that movement of the first and second actuation plates 300,310 causes the first and second cam rods 340,350 to move closer together or further apart. This movement of the first and second cam rods 340,350 can be used to move the first and second cam rods 340,350 to deflect tabs 7 of the lower straps 4. Protrusions 400,410 formed on the first and second cam rods 340,350 assist the first and second cam rods 340,350 in deflecting tabs of the lower straps 4. Similarly, movement of the first and second cam rods 340,350 can be used to stop the first and second cam rods 340,350 from deflecting tabs 7 of the lower straps 4. In more detail, the first and second actuation plates 300,310 can be moved such that the first and second cam rods 340,350 move closer to each other and do not abut against the tabs 7 of the lower straps 4.

The lower holding fixture 200 further includes notches 380 formed therein. The notches 380 are structured to receive the lower straps 4. Thus, all the lower straps 4 to be included in the grid 10 can be placed in the notches 380 of the lower holding fixture 200.

Although a lower holding fixture 200 has been described with respect to FIGS. 8 and 9, it will be appreciated by those having ordinary skill in the art that a corresponding upper holding fixture may be formed by replacing the notches 380 of the lower holding fixture 200 with stand-offs 39, such as those shown in FIG. 4B. Therefore, for economy of disclosure, a separate description of the upper holding fixture corresponding to the lower holding fixture 200 of FIGS. 8 and 9 has been omitted and it will be appreciated by those having ordinary skill in the art that that a corresponding upper holding fixture formed by replacing the notches 380 with stand-offs 39 may be formed as well as employed in conjunction with the lower holding fixture 200 without departing from the scope of the disclosed concept.

Figure 2:
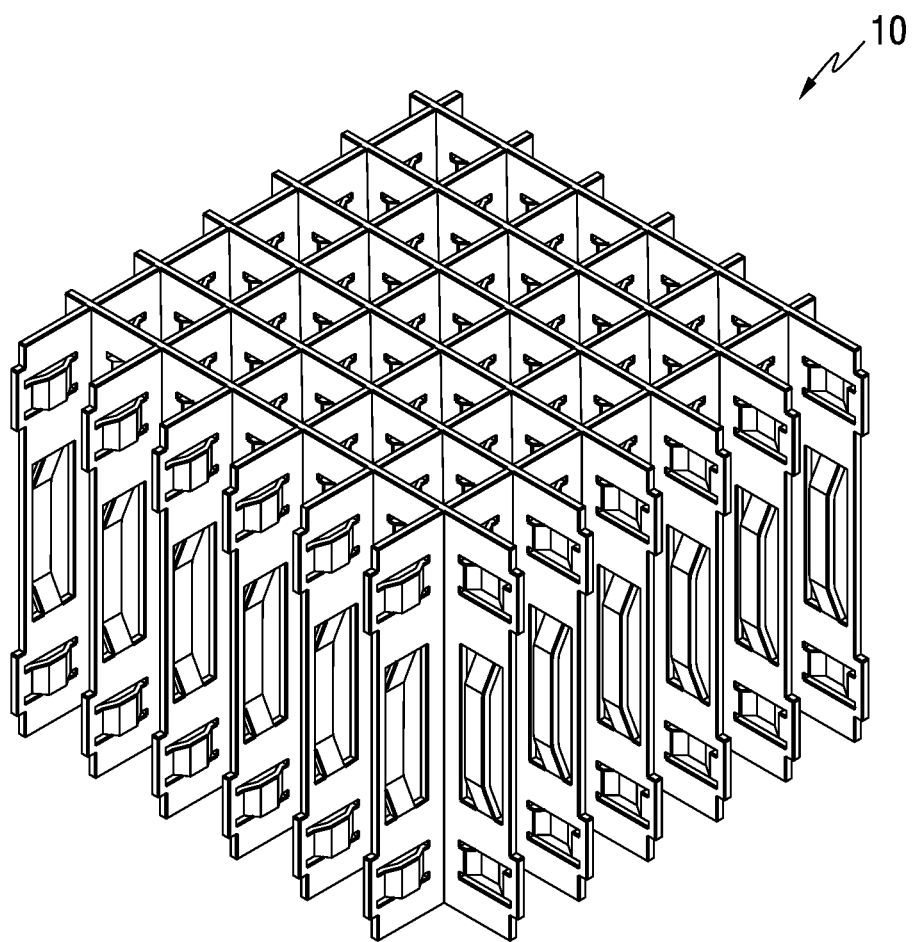
FIG. 2 is an isometric view of a portion of an assembled grid.

As described herein, the various holding fixtures can be used to assist in assembling a support grid for nuclear fuel rods, such as the grid 10 shown in FIG. 2. By using the various holding fixtures described herein, the upper and lower straps 2,4 of the grid 10 can be mated together simultaneously. Additionally, the various holding fixtures can deflect tabs 7 of the upper and lower straps 2,4 so as to form V-shapes in their slots 6 and allow the upper and lower straps 2,4 to be mated together even if there is some misalignment between them. Thus, the holding fixtures described herein reduce the labor, cost and errors conventionally associated with assembling support grids for nuclear fuel rods.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A holding fixture for assisting in assembly of a support grid for nuclear fuel rods and including a plurality of straps each having a plurality of slots extending a portion of a height of the straps and tabs formed beside or between the slots, the holding fixture comprising:
    an actuation plate;
    a support plate having a plurality of receiving members structured to receive therein straps of the support grid and having a plurality of cells; and
    a plurality of cam assemblies structured to move to deflect every other tab of the straps received in the plurality of receiving members,
    wherein the cam assemblies are disposed in every other cell of the support plate, and
    wherein when the cam assemblies deflect every other tab of the straps, the slots form V-shapes.

2. The holding fixture of claim 1, wherein the receiving members are notches formed in the support plate.

3. The holding fixture of claim 1, wherein the receiving members are stand-offs extending from a surface of the support plate.

4. The holding fixture of claim 1, wherein the cam assemblies are structured to move to deflect every other tab of the straps based on movement of the actuation plate with respect to the support plate.

5. A holding fixture for assisting in assembly of a support grid for nuclear fuel rods and including a plurality of straps each having a plurality of slots extending a portion of a height of the straps and tabs formed beside or between the slots, the holding fixture comprising:
    an actuation plate;
    a support plate having a plurality of receiving members structured to receive therein straps of the support grid and having a plurality of cells; and
    a plurality of cam assemblies structured to move to deflect every other tab of the straps received in the plurality of receiving members,
    wherein the cam assemblies are disposed in every other cell of the support plate,
    wherein the cam assemblies are structured to move to deflect every other tab of the straps based on movement of the actuation plate with respect to the support plate, and wherein the cam assemblies each include:
    a plurality of cam rods attached to the actuation plate and extending in a direction substantially perpendicular away from the actuation plate; and
    a plurality of lever members attached to the support plate and being structured to move to deflect or stop deflecting tabs of straps received in the plurality of receiving members,
    wherein the support plate includes a plurality of openings each structured to allow one of the plurality of cam rods to pass therethrough, and
    wherein the lever members are structured to move to deflect or stop deflecting tabs of straps received in the plurality of receiving members based on movement of the actuation plate with respect to the support plate.

6. The holding fixture of claim 5, wherein the lever members are structured to move to deflect or stop deflecting tabs of straps received in the plurality of receiving members based on movement of the actuation plate toward or away from the support plate.

7. The holding fixture of claim 1, wherein the actuation plate includes a first actuation plate and a second actuation plate, wherein the first actuation plate and the second actuation plate are structured to move with respect to each other, and wherein the cam assemblies are structured to move to deflect every other tab of the straps based on movement of the first actuation plate with respect to the second actuation plate.

8. The holding fixture of claim 7, wherein the cam assemblies include:
    a plurality of first cam rods attached to the first actuation plate and extending in a direction substantially perpendicular away from the first actuation plate; and
    a plurality of second cam rods attached to the second actuation plate and extending in a direction substantially perpendicular away from the second actuation plate,
    wherein the support plate includes a plurality of openings each structured to allow one pair of the first and second cam rods to pass therethrough, and
    wherein the first and second cam rods are structured to move toward or away from each other based on movement of the first actuation plate with respect to the second actuation plate.

9. The holding fixture of claim 8, wherein each of the first and second cam rods includes a protrusion formed thereon and structured to abut against and deflect tabs of the straps when the first and second cam rods move away from each other.

10. A holding fixture pair for assisting in assembly of a support grid for nuclear fuel rods and including a plurality of upper straps and a plurality of lower straps each having a plurality of slots extending approximately half a height of the upper or lower straps and tabs formed beside or between the slots, the holding fixture pair comprising:
- an upper holding fixture comprising:
  - an upper actuation plate;
  - an upper support plate having a plurality of stand-offs structured to receive therein upper straps of the support grid and having a plurality of upper cells; and
  - a plurality of upper cam assemblies structured to move to deflect every other tab of the upper straps received in the plurality of stand-offs,
  - wherein the upper cam assemblies are disposed in every other upper cell of the upper support plate, and
- a lower holding fixture comprising:
  - a lower actuation plate;
  - a lower support plate having a plurality of notches structured to receive therein lower straps of the support grid and having a plurality of lower cells; and
  - a plurality of lower cam assemblies structured to move to deflect every other tab of the lower straps received in the plurality of notches,
  - wherein the lower cam assemblies are disposed in every other lower cell of the lower support plate.

11. The holding fixture pair of claim 10, wherein the upper cam assemblies are structured to deflect tabs of the upper straps in opposite directions of the directions the lower cam assemblies are structured to deflect tabs of the lower straps.

12. The holding fixture pair of claim 10, wherein when the upper holding fixture and the lower holding fixture face each other, the upper cam assemblies face empty lower cells of the lower holding fixture and the lower cam assemblies face empty upper cells of the upper holding fixture.

13. The holding fixture pair of claim 10, wherein slots are formed between tabs of the upper and lower straps, and wherein when the upper and lower cam assemblies deflect every other tab of the upper and lower straps, the slots form V-shapes.

14. The holding fixture pair of claim 10, wherein the upper cam assemblies are structured to move to deflect every other tab of the upper straps based on movement of the upper actuation plate with respect to the upper support plate and the lower cam assemblies are structured to move to deflect every other tab of the lower straps based on movement of the lower actuation plate with respect to the lower support plate.

15. The holding fixture pair of claim 14, wherein the upper and lower cam assemblies each include:
- a plurality of cam rods attached to the upper or lower actuation plate and extending in a direction substantially perpendicular away from the upper or lower actuation plate; and
- a plurality of lever members attached to the upper or lower support plate and being structured to move to deflect or stop deflecting tabs of the upper or lower straps,
- wherein the upper and lower support plates include a plurality of openings each structured to allow one of the plurality of upper or lower cam rods to pass therethrough, and
- wherein the lever members are structured to move to deflect or stop deflecting tabs of the upper or lower straps based on movement of the upper or lower actuation plate with respect to the upper or lower support plate.

16. The holding fixture pair of claim 10, wherein the upper actuation plate includes a first upper actuation plate and a second upper actuation plate and the lower actuation plate includes a first lower actuation plate and a second lower actuation plate, wherein the first upper actuation plate is structured to move with respect to the second upper actuation plate and the first lower actuation plate is structured to move with respect to the second lower actuation plate, and wherein the upper cam assemblies are structured to move to deflect every other tab of the upper straps based on movement of the first upper actuation plate with respect to the second upper actuation plate and the lower cam assemblies are structured to move to deflect every other tab of the lower straps based on movement of the first lower actuation plate with respect to the second lower actuation plate.

17. The holding fixture pair of claim 16, wherein the upper and lower cam assemblies each include:
- a plurality of first cam rods attached to the first upper or lower actuation plate and extending in a direction substantially perpendicular away from the first upper or lower actuation plate; and
- a plurality of second cam rods attached to the second upper or lower actuation plate and extending in a direction substantially perpendicular away from the second upper or lower actuation plate,
- wherein the upper and lower support plates include a plurality of openings each structured to allow one pair of the first and second cam rods to pass therethrough, and
- wherein the first and second cam rods are structured to move toward or away from each other based on movement of the first upper or lower actuation plate with respect to the second upper or lower actuation plate.

18. The holding fixture pair of claim 17, wherein each of the first and second cam rods includes a protrusion formed thereon and structured to abut against and deflect tabs of the upper or lower straps when the first and second cam rods move away from each other.

19. A method for assembling a support grid for nuclear fuel rods, the method comprising:
- providing the holding fixture of claim 1;
- providing a plurality of upper straps and a plurality of lower straps each having a plurality of slots extending approximately half a height of the upper or lower straps and tabs formed beside or between the slots;
- deflecting every other tab of the upper straps;
- deflecting every other tab of the lower straps;
- mating the upper straps and the lower straps; and
- releasing deflections of the tabs of the upper and lower straps.

* * * * *